United States Patent [19]

Benard et al.

[11] Patent Number: 4,759,179
[45] Date of Patent: Jul. 26, 1988

[54] METHOD FOR GENERATING ELECTRONICALLY EXCITED NF FOR USE IN A LASER

[75] Inventors: David J. Benard; Robert H. Cohn, both of Thousand Oaks, Calif.

[73] Assignee: Rockwell International Corporation, El Segundo, Calif.

[21] Appl. No.: 75,503

[22] Filed: Jul. 20, 1987

[51] Int. Cl.$^4$ .................. C01B 21/08; H01S 3/22; H01S 3/095; C06D 3/00
[52] U.S. Cl. .................................. 60/218; 149/35; 372/55; 372/89; 423/406
[58] Field of Search .................. 423/406, 489; 372/55, 372/89; 149/35, 109.6; 60/218

[56] References Cited

U.S. PATENT DOCUMENTS

| | | | |
|---|---|---|---|
| 4,001,380 | 1/1977 | Gordon et al. | 423/406 |
| 4,165,773 | 8/1979 | Coombe | 149/109.6 |
| 4,188,592 | 2/1980 | Buczek et al. | 372/89 |
| 4,193,261 | 3/1980 | English | 372/89 |
| 4,334,200 | 6/1982 | Freeman et al. | 372/55 |
| 4,543,242 | 9/1985 | Aranaki et al. | 423/406 |
| 4,650,416 | 3/1987 | Warren et al. | 372/89 |

OTHER PUBLICATIONS

Williams et al., ed., *Endeavor*, XXIV (Sep. 1965), p. 138–Colburn (auth), "The Fluorides of Nitrogen".

Primary Examiner—Edward A. Miller
Attorney, Agent, or Firm—H. Fredrick Hamann; Craig O. Malin

[57] ABSTRACT

Electronically excited nitrogen fluoride, NF*, is generated by dissociating fluoride azide, $FN_3$. In a preferred embodiment, the $FN_3$ is reacted with vibrationally excited molecules such as hydrogen halide, deuterium halide, carbon dioxide, or nitrogen. In second and third embodiments, the $FN_3$ is dissociated by laser pumping or by detonation. The NF* can provide a short wavelength laser by pumping the NF(b-X) transition in a resonant chamber or by the addition of an emitting species such as BiF to convert the stored energy of the NF* to photons from the emitting species.

13 Claims, 4 Drawing Sheets

METHOD FOR GENERATING ELECTRONICALLY EXCITED NF FOR USE IN A LASER

BACKGROUND OF THE INVENTION

This invention relates to the field of chemistry and particularly to the field of producing electronically excited molecules of nitrogen fluoride (NF*).

A molecule is in an electronically excited state when the arrangement of its electrons about the nucleus places it in an energy state above its usual ground state. Molecules such as NF are known to exist in several different energy states. The two lowest electronically excited states of NF* are the NF(a) and the NF(b) states which are generated by the method of this invention.

Electronically excited nitrogen fluoride, NF*, has been produced by microwave discharge of $NF_3$ molecules. However, NF* is produced in such low concentrations as to limit the usefulness of the method. Additionally, a source of microwave power is required.

NF* has been produced by chemical means. As described by Herbelin and Cohen in CHEMICAL PHYSICAL LETTERS, Vol. 20, Page 605 (1973), $NF_2$ can be reacted with H, D, or $CH_3$ to produce NF(a), i.e., $H + NF_2 \rightarrow NF(a) + HF$. Although higher concentrations of NF* are produced by the reaction with $NF_2$, the atomic hydrogen used in the reaction quenches the NF*.

Another chemical method for producing NF* is described by R. D. Coombe in U.S. Pat. No. 4,165,773. According to the Coombe's patent, NF* is formed by reacting fluorine atoms with azide radicals according to the reaction: $2F + HN_3 = NF^* + N_2 + HF$. However, a need still exists for a more efficient and scalable method of generating higher concentrations of NF* than is provided by the prior art methods.

SUMMARY OF THE INVENTION

It is an object of the invention to provide an improved method of generating electronically excited nitrogen fluoride (NF*).

It is an object of the invention to provide high concentrations of NF*.

It is an object of the invention to provide a method of generating NF* which efficiently utilizes the reactants.

It is an object of the invention to provide a method of generating NF* without forming reactive by-products or intermediates.

It is an object of the invention to provide NF* which can be used for a chemical laser.

It is an object of the invention to provide a high energy, short wavelength, chemical laser.

According to the invention, $FN_3$ is dissociated into NF* by transferring vibrational energy to the $FN_3$. In a preferred embodiment, this is accomplished by mixing gaseous $FN_3$ with vibrationally excited molecules such as HF(v), DF(v), $CO_2(v)$, $SF_6(v)$, and $N_2(v)$ according to the reaction: $Molecules(v) + FN_3 \rightarrow Molecules + N_2 + NF^*$. In a second embodiment of the invention, the $FN_3$ is dissociated by optically pumping it at a frequency tuned to a vibrational transition of $FN_3$. In a third embodiment, the $FN_3$ is detonated with a source of energy such as a spark or mechanical shock.

The electronic energy in the NF* can be used to provide a chemical laser. Energy for a laser can be extracted directly by lasing on one of the transitions of NF* to ground state. Because of the low stimulated emission cross section of NF*, a lasing species may be included in the mixture to convert the lasing radiation. The energy stored in NF* can be transferred to a more suitable emitting species such as BiF. The BiF rapidly accepts electronic energy from NF* and converts it efficiently to visible radiation. A chemical laser is provided when the $FN_3$ in a mixture of $FN_3$ and BiF is dissociated near an optical resonator.

These and other objects and features of the invention will be apparent from the following detailed description taken with reference to the accompanying drawings.

DESCRIPTION OF THE PREFERRED EMBODIMENTS

Background: The molecule $FN_3$ known as fluorine azide was first synthesized by J. F. Haller is 1942 by reacting $HN_3$ with $F_2$. Haller observed that $FN_3$ was a volatile gas that was subject to spontaneous detonation in its liquid phase. Upon heating, $FN_3$ gas decomposes to $N_2F_2$ and $N_2$ over a period of minutes to hours without explosion. Later investigators interested in synthesizing $N_2F_2$ demonstrated that $FN_3$ could also be generated by the action of $F_2$ on solid $NaN_3$.

Calculations confirming the principle of the invention showed a correlation of the singlet ground state of $FN_3$ to $NF(a,b) + N_2$ and located the $FN_3$ ground state above the separated $NF(a,b) + N_2$ states with a barrier of approximately 0.5 eV to dissociation of the central FN-$N_2$ bond. In this invention, $FN_3$ is dissociated to generate a chemical source of NF(a) metastables. The NF(a) can then be used to power a visible wavelength laser system.

The dissociation of $FN_3$ has been studied using a photolysis cell and a flow tube. $FN_3$ was synthesized as described later (Source of $FN_3$), and a gas stream containing 2-5% $FN_3$ was directed via Teflon and stainless steel tubing to the photolysis cell or to the flowtube.

Photolysis Cell Experiments: An untuned, transversely-excited, atmospheric pressure $CO_2$ laser, in the coaxial pin discharge geometry, was constructed following prescriptions in the literature. The laser generated 150 mj pulses, which were focused by a ZnSe lens of 20 cm focal length into a stainless steel photolysis cell with NaCl Brewster windows. Exposure of thermal image paper at the beam waist, centered in the photolysis chamber, demonstrated that the laser was operating in a cylindrically symmetric donut mode with a cross sectional area of 0.015 $cm^2$, corresponding to a fluence of approximately 10 $J/cm^2$, sufficient for multiphoton dissociation of $SF_6$. A thin Si wafer at Brewster's angle was interposed between the $CO_2$ laser and the photolysis cell to pass the 10.6 u laser radiation while preventing any visible emissions of the laser discharge from entering the photolysis chamber. The side arms of the photolysis chamber through which the laser beam passed were isolated from the photolysis region itself by internal apertures purged by an Ar flow to prevent absorption of the laser radiation, except in the central 2.5 cm of the cell. The gases admitted to the photolysis cell included the $HN_3$/He or $FN_3$/HF/He flow, $SF_6$, $H_2$ or $D_2$ and $CO_2$. The pressure in the photolysis cell was monitored by an inductance transducer and regulated via a metering valve in the exhaust line to vacuum. The photolysis region was optically monitored perpendiular to the laser beam by an unfiltered GaAs photomuliplier tube senstive from 900 to 200 nm. The anode currents were led to a wide bandwidth premplifier which drove the input of a digital signal averager that was electrically synchonized to the firing of the $CO_2$ laser.

The absorption of the $CO_2$ laser radiation was first optimized by adjusting the partial pressure of $SF_6$ while monitoring the transmission of the $CO_2$ laser beam through the photolysis cell with an energy meter. The laser radiation was approximately 50% absorbed by 5 Torr partial pressure of $SF_6$ which was used in the remainder of the experiments. Typical partial pressures of $HN_3$ or $FN_3$ were 100–300 mTorr with total pressures near 16 Torr primarily due to He diluent gas and Ar window purge. Since this method of producing $FN_3$ is subject to $HN_3$ impurities, experiments were conducted on $HN_3$/$SF_6$ mixtures to gauge the potential impurity effects. Visible emissions from $SF_6$/$HN_3$ mixtures were detected with increased intensity in proportion to the $HN_3$ partial pressure. The emission signal was eliminated by turning off either the $SF_6$ or the $HN_3$ flow and by detuning the resonator of the $CO_2$ laser. By varying the laser energy, a nonlinear threshold of 120 mj was established for the appearance of the $HN_3$ signal. To test the hypothesis that the emission was due to the F+$HN_3$ reaction, following multiphoton dissociation of the $SF_6$, small amounts of $H_2$ were added to the mixture to scavenge the F-atoms. The detected signal was reduced a factor of five by 200 m Torr of $H_2$ and was totally extinguished by 1 Torr of added $H_2$, thereby confirming the origin of the detected signals.

Photolysis of $SF_6$/$FN_3$ mixtures produced a signal that was twice as intense and of longer duration than the $SF_6$/$HN_3$ signals. Since this result cannot be explained by the $HN_3$ impurity, and there is little potential for chemiluminescent reaction between F-atoms and $FN_3$, some visible emission is shown to derive from vibrational energy transfer from laser-excited $SF_6$ molecules to $FN_3$. Addition of small quantities of $H_2$ to the $SF_6$/$FN_3$ mixtures produced up to a tenfold increase in emission intensity. The signal rose rapidly in the first 10 microseconds, held nearly constant out to 100 microseconds, and then decayed exponentially with a 100 microseconds time constant. The observed time dependence of these signals was as much influenced by diffusion, due to the tight focusing of the laser beam, as by reaction kinetics. Therefore, kinetic rate information cannot easily be extracted from the time profiles. The results, however, do show that the visible emission process was significantly aided by the products of the F+$H_2$ reaction which include vibrationally excited HF molecules an H-atoms.

Figure 1:
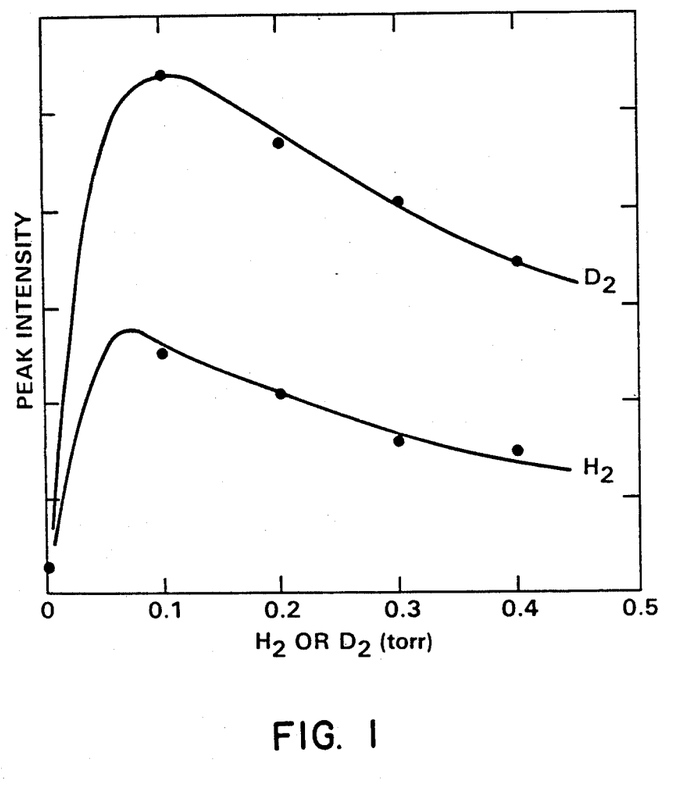
FIG. 1 is a graph showing the effect of $H_2$ and $D_2$ addition on the peak emission intensity caused by $CO_2$ laser excitation of an $SF_6/FN_3$ gas mixture.

FIG. 1 shows the change of peak emission intensity in the $SF_6$/$FN_3$ mixtures with the addition of varied amounts of $H_2$ and $D_2$. The strong isotope effect that is observed is incompatible with a chemiluminescence mechanism that is controlled by reaction of the H/D atoms, since D-atom reactions are slower due to their lower thermal velocities. The vibrationally excited HF/DF products, however, have significantly altered vibrational spacings. Therefore, the isotope effect can be explained by resonance effects such as occur in V-V energy transfer reactions. The data is, therefore, consistent with the notion that the chemiluminescence arises due to the production of NF(a) from dissociation of $FN_3$ caused by V-V energy transfer from vibrationally excited HF/DF molecules. The H/D-atoms may still have a role, however, in the production of the visible emission. The chemiluminescence from an optimized $SF_6$/$FN_3$/$D_2$ mixture was visually observed to be of red-orange color, suggesting excitation of the $N_2$(B A) band system. A likely mechanism which accounts for the photolysis cell observations is:

$$F+D_2 \rightarrow DF(v)+D \qquad (1)$$

$$DF(v)+FN_3 \rightarrow DF+N_2+NF(a) \qquad (2)$$

$$D+NF(a) \rightarrow DF+N_2(^2D) \qquad (3)$$

$$N(^2D)+NF(a) \rightarrow N_2(A)+F \qquad (4)$$

$$N_2(A)+N_2(A) \rightarrow N_2(B)+N_2(X) \qquad (5)$$

$$N_2(B) \rightarrow N_2(A)+h\nu. \qquad (6)$$

Of the above, reaction (2) illustrates the generation of electronically excited nitrogen fluoride (NF(a)) utilizing vibrationally excited deuterium fluoride (DF(v)) to dissociate the fluoride azide ($FN_3$). Reaction (1) is the basis for the well-known HF/DF chemical laser and the sequence of reactions (3–6), producing $N_2$(B→A) emission, has been observed by several investigators in other chemical systems that produce NF(a) and D-atoms. The equivalent reactions with H substituted for D also occur. Present results suggest that reaction (2) is faster or more efficient with D atoms in place of H atoms, which implies that the barrier height for dissociation of $FN_3$ is probably smaller than 4000 cm$^{31}$ $^1$ or 0.5 eV.

Figure 2:
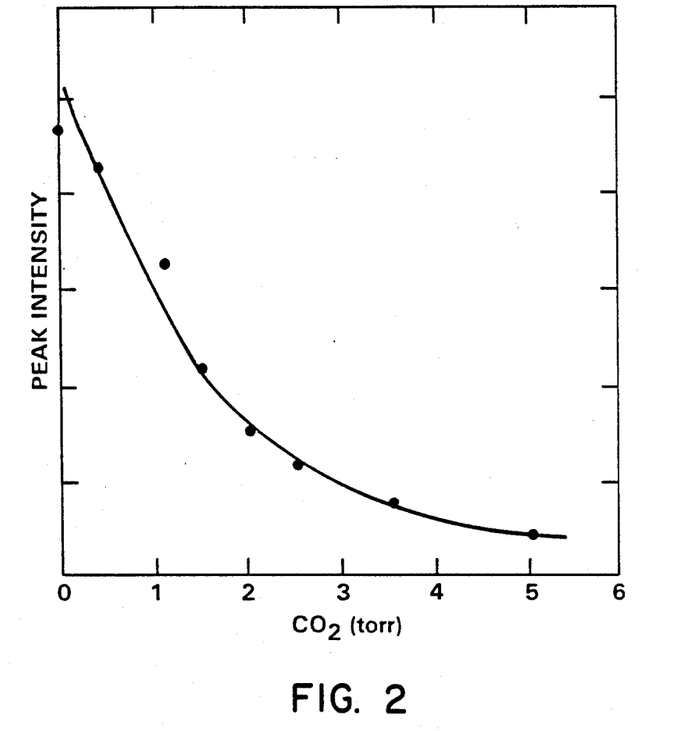
FIG. 2 is a graph showing the effect of $CO_2$ addition on the peak emission intensity caused by $CO_2$ laser excitation of an optimized $SF_6/FN_3/D_2$ gas mixture.

A further test of the reactive mechanism described above was made by adding $CO_2$ to the optimized $SF_6$/$FN_3$/$D_2$ mixture. In this system, $CO_2$ is expected to be chemically inert, but it is still a good quencher of vibrationally excited DF. Therefore, as $CO_2$ is added, the intensity of emission should decline. FIG. 2 shows that the expected trend was indeed obtained. A lower limit on the rate of DF(v) quenching can be estimated from the data in FIG. 2, if reaction (2) is accepted as being critical to the production of the visible emission. Since a limited supply of DF(v) is formed, competition occurs between reaction (2) and the quenching of DF(v) by $CO_2$. When the $CO_2$ concentration is adjusted to a point where:

$$k_{DF\text{-}CO_2}[CO_2]=k_{DF\text{-}FN_3}[FN_3] \qquad (7)$$

the yield of visible emission is halved. Since $k_{DF\text{-}CO_2}$ is known to have a value of $2 \times 10^{-11}$ cm$^3$/s, and 1.3 Torr of $CO_2$ is required to halve the emission from a mixture containing approximately 100 mTorr of $FN_3$, $k_{DF\text{-}FN_3}$ is shown to be roughly $2.6 \times 10^{10}$ cm$^3$/s. There are two potential sources of error in this determination which include the quenching action of $CO_2$ on the emitting species or its precursors (other than DF(v)) and the presence of other significant DF(v) quenchers. The auxiliary effects of the $CO_2$ result in an underestimation of $k_{DF-FN_3}$. Since the estimated value of $k_{DF-FN_3}$ is already of gas kinetic magnitude, we need only be concerned with the presence of other DF(v) quenchers. The known rates of DF(v) quenching by $SF_6$, DF, $N_2$ and He, however, are all too small to compete with the rate of DF(v) quenching, provided by the $CO_2$ that is present. Therefore, the sensitivity of the emission intensity to added $CO_2$ demonstrates a near gas kinetic rate for DF(v) quenching by $FN_3$, if reactions (1-6) are the mechanism responsible for the visible emission.

Flowtube Experiments: The flowtube was constructed of 1.5 in. ID stainless steel tubing with coaxial central and annular injectors that were movable with respect to a fixed observation port consisting of four sapphire windows positioned around its circumference. All interior surfaces were Teflon coated to minimize wall recombination of F-atoms. A sonic orifice at the exhaust limited the plug flow velocity to approximately 1000 cm/s. A premixed flow of 8% $F_2$ in He was admitted to the outer annulus of the flowtube through an alumina tube well upstream of the observation port and the injectors. A 100 W microwave cavity on the alumina tube was employed to discharge the $F_2$/He gas mixture as it entered the flowtube. Previous studies, using the $Cl_2$ titration method, demonstrated that approximately 50% of the $F_2$ is dissociated in the discharge and that negligible recombination of the F-atoms occurs within the flowtube. At the annular injector, either a mixture of $D_2$ and He or $N_2H_4$ and He was added. The $D_2$/He was mixed from separate tanks of each gas, while the $N_2H_4$/He flow was obtained by bubbling He through liquid $N_2H_4$ at room temperature and reduced pressure maintained by a vacuum regulator. The $HN_3$/He or $FN_3$/HF/He flow was admitted to the central injector which was located just upstream of the observation port. The order of reaction was therefore, $F+D_2$ or $N_2H_4$, following by the reaction of the products with $HN_3$ or $FN_3$. A precision capacitance manometer was employed to monitor the pressure of the gases at the observation port on the flowtube. A fiber optical bundle conducted chemiluminescent emissions, originating in the vicinity of the observation port to the entrance slit of a grating monochomator. At the exit slit of the monochromator, a diode array and an optical multichannel analyzer (OMA) were used to record the emission spectrum.

Spectroscopic observations needed to verify reactions (1-6) were not practical in the photolysis experiment due to the small volume of the gas excited by the $CO_2$ laser and the extremely low duty cycle of the experiment. To correct this difficulty, the reactions of F-atoms with $D_2$ and $HN_3$/$FN_3$ were studied in the flowtube reactor which produced continuous and bright chemiluminescence over a large volume. Typical partial pressures in the flowtube were 100 mTorr $F_2$, 2-5 m Torr $HN_3$ or $FN_3$, and 0-10 mTorr $D_2$ or $N_2H_4$ with He buffer gas to a total pressure of 0.5-1.0 Torr. The reaction of F-atoms with $HN_3$ produced a green flame, due to NF(b→X) emission at 528 nm, as noted by Coombe. As the $F_2$ was titrated with the $HN_3$ to produce $FN_3$ upstream of the flowtube, the intensity of the flame in the flowtube diminished and was extinguished entirely at a point close to the optimum production of $FN_3$, as judged by absorption at 425 nm in an upstream spectrophotometer cell. The reaction of F-atoms with $D_2$ and $FN_3$ produced a bright red-orange diffuse flame which extended 10-20 cm down the flowtube. The visual appearance of the flame was identical to the chemiluminescence produced in the photolysis experiment except for intensity and spatial distribution. Elimination of $D_2$, $FN_3$, $F_2$ or the microwave discharge extinguished the flame. The red-orange emission was confirmed as originating from the $N_2$(B→A) transitions by an OMA scan from 500-700 nm.

Figure 3:
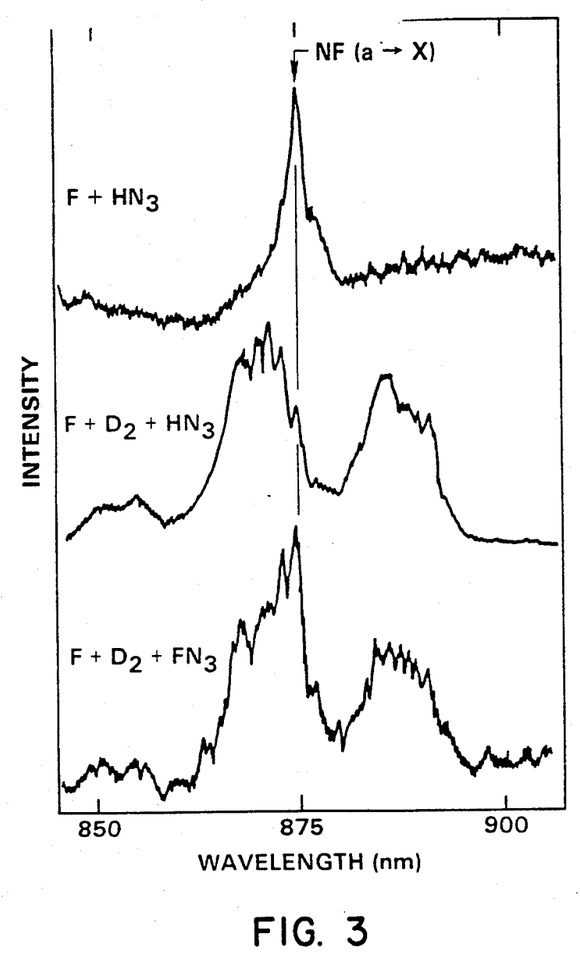
FIG. 3 is a comparison of flowtube emission spectra.

FIG. 3 shows a comparison of near-infrared chemiluminescent emission spectra obtained from the flowtube reactor. All three traces were recorded with identical sensitivity. The upper trace, corresponding to the reaction of $HN_3$ with excess F-atoms, is provided for reference. The single peak in the spectrum, assignable to the NF(a→X) transition at 872 nm, is well-known to correspond to the production of essentially one NF(a) molecule per $HN_3$ molecule reacted. The central trace was produced by adding sufficient $D_2$ to reduce the NF(a) emission by half, by scavenging F-atoms in competition with the $F+HN_3$ reaction. The new emissions lying to either side of the NF(a→X) transition are a result of the subsequent reaction of the D-atoms produced by the $F+D_2$ reaction. In the bottom trace, the $HN_3$ is converted to $FN_3$, which fully restores the NF(a→X) intensity. Since the conversion of $HN_3$ to $FN_3$ by reaction with $F_2$ prior to the flowtube is at most 100% efficient, and since the $F+HN_3$ reaction is known to be a highly efficient source of NF(a), the generation of equivalent concentrations of NF(a) in the $F+HN_3$ and $F+D_2+FN_3$ flames demonstrates that $FN_3$ dissociates to NF(a) with high efficiency.

The rise and fall of the NF(a) concentration with time in flow was monitored by moving the injector probes relative to the fixed observation port. Starting from the position of the $FN_3$ injector, the NF(a) concentration rose to its peak in about 4 ms and then decayed exponentially at a rate of approximately 200/s. The rate of rise is attributable to mixing of the reactants since the 4 ms rise time corresponds to the inner diameter of the flowtube. The decay rate is in close agreement with earlier measurement of the loss of NF(a) following the $F+HN_3$ reaction in a flow tube of similar design. This loss was attributed to quenching on the flowtube wall. Since the rate of reaction (3) is slow, the decay of NF(a) in our experiment is also dominated by wall losses. The $N_2$(B→A) emission also died out over the same range as the NF(a) concentration, consistent with its production by reactions (3-6). Equivalent yields of NF(a) were also obtained by substituting $N_2H_4$ for $D_2$. Since the reaction of F-atoms with $N_2H_4$ yields vibrationally excited HF, but few H-atoms, this result demonstrates that H-atoms do not play a critical role in the production of NF(a). Therefore, dissociation of the $FN_3$ to yield NF(a) efficiently is shown to be drivn by HF/DF(v) which also confirms the preceding kinetic analysis for the rate of reaction (2).

I. DISSOCIATION BY VIBRATIONALLY EXCITED MOLECULES

Reactions: The above experiments confirm the following reactions which are the basis for the NF(a) generator of the invention:

$$HF(v)+FN_3 \rightarrow HF+N_2+NF(a) \tag{8}$$

$$DF(v) + FN_3 \rightarrow DF + N_2 + NF(a) \tag{2}$$

The efficiency of NF(a) production in reaction (2) has been shown to be high by comparison to the $F+HN_3$ reaction. Moreover, the rate of reaction (2) has been determined to be of gas kinetic magnitude by competition with the known rate of DF(v) quenching by $CO_2$. Since reactions (8) and (2) do not involve radical intermediates and the by-products ($N_2$ and HF/DF) are known to be slow quenchers of NF(a), it is anticipated that very large metastable concentrations of NF* can be achieved given an adequate supply of vibrationally excited HF or DF molecules. These can be obtained as in the HF/DF chemical laser, by reacting F-atoms with either $H_2$ or $D_2$. While this approach is simple and based on a mature technology, it is problematical in two regards. First, the H/D-atom by-products of this reaction can attack the $FN_3$ molecules producing free $N_3$ radicals which self annihilate. Second, V-V transfer reactions limit the scaling of HF/DF(v) concentrations to about $10^{15}/cm^3$ before the inversion is destroyed. For the purpose of driving reactions (8) or (2), however, an inverted vibrational distribution is not required or even desirable. Therefore, in the NF(a) generator, scaling of the HF/DF(v) concentration is limited only by the V-T reactions. Since the V-T rates are typically one order of magnitude smaller than the V-V rates, HF/DF(v) concentrations may approach $10^{16}/cm^3$.

Still higher NF(a) concentrations may be produced, however, by using an HF/DF chemical laser to optically pump HF/DF molecules that have been seeded into an $FN_3$ flow, if one HF/DF molecule is added for every ten $FN_3$ molecules. The quenching of the HF/DF(v) molecules is then dominated by collisions with $FN_3$ and each HF/DF molecule cyclically absorbs ten photons from the HF/DF laser and dissociates ten $FN_3$ molecules. Therefore, NF(a) concentrations up to $10^{17}/cm^3$ are achievable by optical pumping without introducing reactive by-products. The large optical cross sections that are associated with the vibrational transitions of HF/DF ensure efficient optical power transfer as demonstrated in the HF/DF optical resonance transfer laser (ORTL). The high mass efficiency of the HF/DF chemical laser (400 kj/kg) also ensures that the mass of the HF/DF laser fuels and diluent do not significantly limit the mass efficiency of the NF(a) generator. While the effective mass of the HF/DF laser fuels (78 amu) is comparable to the mass of the $FN_3$ (61 amu), it has little effect on the overall system efficiency which is dominated by the mass of the diluents required to absorb reactive heating. Nonetheless, because of the large amount of energy that is stored in each NF(a) molecule, specific energies for the coupled HF/DF laser and NF(a) generator may exceed 400 kj/kg. Therefore, an NF* generator, based on reaction (8) or (2), and driven by a conventional HF/DF chemical laser, appears to be both efficient and scalable to useful NF(a) concentrations.

There are two approaches which can be followed, given the NF(a) generator described above, to achieve lasing at a visible wavelength. The simplest approach is to rely on the resonant V→E transfer reaction:

$$HF(v \geq 2) + NF(a^1\Delta) \rightarrow HF(v-2) + NF(b^1\Sigma) \tag{9}$$

in concert with reaction (8) to pump the NF (b→X) transistion at 528 nm. The cross section for this potential laser transition is small (approximately $5 \times 10^{-*}cm^2$), but large enough to sustain useful gain if a significant fraction of the NF(a) can be pumped to the b state. While the rate of reaction (9) is known to be gas kinetic, it may be inefficient due to V-T quenching of the HF vibrational ladder. Use of reaction (2) in combination with BiF addition provides an alternative approach which does not encounter this difficulty since DF(v) is not effective at pumping NF(a) to the b state and the V-T rate for self-quenching of DF(v=1) is also anomalously small (approximately $10^{-13}$ cm$^3$/s). However, these kinetic advantages are offset by the increased difficulties of adding BiF to the NF(a) flow.

Figure 4:
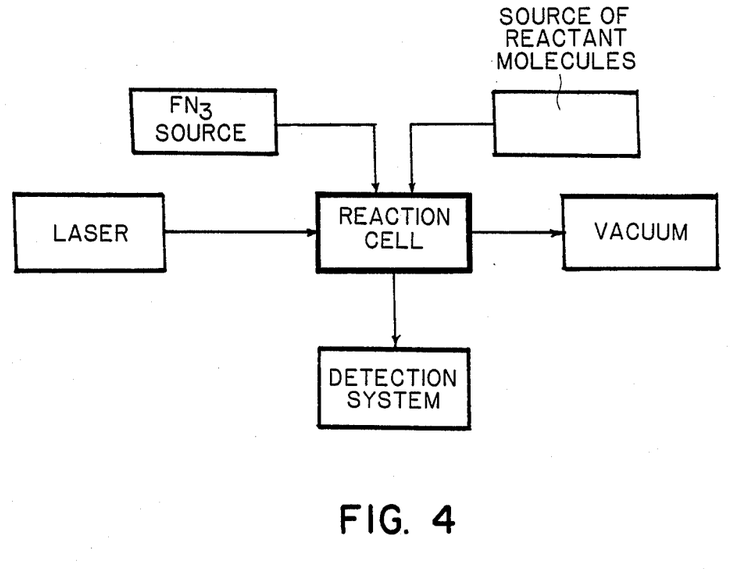
FIG. 4 is a block diagram showing the key elements of an experimental apparatus for demonstrating the invention.

Generator (FIG. 4) FIG. 4 illustrates, in block form, the key elements of an NF(a) generator, including the $FN_3$ source, a reaction cell, a pulsed HF/DF chemical laser, a source of reactant molecules, and a detection system. The NF(a) is generated inside the reaction cell by the action of the chemical laser radiation on the effluent of the $FN_3$ source which contains added HF or DF to absorb the incident laser radiation. The resulting visible wavelength radiation is then analyzed by the detection system. Each of these major subsystems will be discussed below.

Source of $FN_3$: $FN_3$ is generated by reacting $HN_3$ and $F_2$. To produce the $HN_3$ for this reaction, a mixture of 2.0 moles of stearic acid and 0.5 mole of sodium azide in a Pyrex reaction kettle is immersed in a resistivity heated oil bath. The sodium azide-stearic acid mixture is stirred with a Teflon-coated paddle at 1 RPM. A mass flowmeter and vacuum regulator are employed to sweep the reaction kettle with a measured flow of He at a pressure of 350 Torr. The temperature of the oil bath is adjusted to control the rate of $HN_3$ evolution and, hence, the dilution of He.

The $HN_3$/He flow exiting the reaction kettle is directed to a second 600 ml cylindrical stainless steel reactor packed with 0.25 in. diameter stainless steel balls, where a measured flow of 8% $F_2$ in He is also admitted. The secondary reactor is held at a temperature of 35° C. by electrically heated tap water passed through exterior cooling coils. The effluent of the secondary reactor is then passed onto an absorption cell in a visible-ultraviolet spectrophotometer. Absorption at 260 nm is used to assay the partial pressure of $HN_3$ (when the $F_2$ flow is shut off), and the $FN_3$ partial pressure is monitored at 425 nm, where there is negligible absorption by $HN_3$. The $F_2$ flow is adjusted to yield maximum absorption by $FN_3$. Conversion of $HN_3$ to $FN_3$ was estimated to be between 50 and 100% efficient. The titration of the $F_2$ with $HN_3$ is critical since the $FN_3$ yield increases with the $F_2$ flow, but declines with excess $F_2$ since $FN_3$ slowly reacts with $F_2$ to yield $NF_3$ and N2. The HF by-product of the $FN_3$ was not monitored or removed from the flow in the experiments. Following the absorption cell, a metering valve is employed to set the system flow rate at approximately 3 sccm. The gas stream containing typically at least $10^{17}$ molecules of $FN_3$ per cm$^3$ is then directed via Teflon and stainless steel tubing to the reaction cell which in turn exhausts to a vacuum. Because of the hazards posed by azides, the entire synthesis operation is carried out inside a fume hood within a Lexan blast shield.

Source of Reactant Molecules: Reactant molecules such as hydrogen fluoride, deuterium fluoride, carbon dioxide, nitrogen, and other hydrogen and deuterium halides are supplied from gas cylinders which are commercially available or as products of reaction between gases such as fluorine or sulphur hexafluoride, and hydrogen, deuterium or hydrazine which are also available from gas cylinders, with the exception of hydrazine, which is a liquid. The hydrazine vapors over the liquid are entrained by a helium flow for these experiments. A known quantity of the reactant gas is added to the $FN_3$ flowing into the reaction cell. When vibrationally excited by a laser within the cell, these molecules cause the dissociative release of metastable $NF(a^1\Delta)$ which is the driving species for a short wavelength chemical laser according to the invention.

Laser: If one assumes that transfer of one vibrational quantum from HF or DF to $FN_3$ liberates one NF(a) molecule, then it is possible to gauge the requirements for the chemical laser needed in the proposed experiments. As discussed above, $10^{17}/cm^3$ concentrations of NF(a) can be generated by optical pumping of similar $FN_3$ concentrations doped with $10^{16}/cm^3$ concentrations of HF or DF. The optical cross section for the HF/DF vibrational transitions is large (approx. $10^{-16}$ $cm^2$), therefore the incident radiation will be absorbed in about 1 cm. Since large volume is not a requirement of the experiment, the incident laser beam may be mildly focused to a convenient size of approximately 3 mm diameter or about 0.1 $cm^2$ area. The working volume of the experiment is, consequently, approximately 0.1 $cm^3$. The absorption of $10^{16}$ photons, or approx. 1 mJ, will therefore produce the desired amount of vibrational excitation.

The necessary optical radiation can be obtained from a laboratory scale pulsed electric discharge chemical laser. Based on references in the literature, a fast excimer laser-type discharge, through a mixture of $SF_6$, $H_2/D_2$ and He, is capable of generating approximately 3 $mJ/cm^3$ of HF/DF laser radiation in about 300 ns with approximately 40% of the emission on the 1 to 0 transition. For the experiments, a Tachisto Model 150XR excimer laser (active volume 30 $cm^3$) is modified to operate at HF/DF wavelengths. The modifications required include changing the gas fill and optical elements, replacement of one of the Rogowski electrodes by a resistively loaded bed of pins for greater discharge stability, and elimination of the preionizer discharge and ballast volumes by insertion of teflon filler blocks. As a result of these changes, pulse energies on the order of 35 mj (1 to 0 transition) can be expected.

The pulse width is also a critical factor, since each HF or DF molecule must absorb a photon and then quench on $FN_3$ at least ten times during the laser pulse. Assuming a gas kinetic rate of quenching by $FN_3$ ($10^{-10}$ $cm^3/s$) as the limiting factor, cycle times will be on the order of 100 ns. Therefore, a 1 microsecond pulse width is required. By reducing the concentration of $SF_6$ and $D_2$ in the chemical laser, longer pulse widths (up to 5 microseconds) can be achieved at the cost of proportinally reduced pulse energy. Thus, for a 1 us pulse width, approx. 10 mj will be available for pumping the HF or DF molecules in the presence of $FN_3$. Therefore, an order of magnitude margin exists to accommodate slower cycle times, reduced performance in the laser and inefficiencies in the NF(a) generation process. Still further margin can be achieved by tighter focusing of the laser beam in the reaction cell.

Reaction Cell: The laser radiation for exciting the reactant molecules is focused into the reaction cell via a sapphire lens. The reaction cell is constructed of stainless steel with sapphire windows. The design includes apertures located to geometrically define the optically pumped region. The windows used to admit the laser radiation are purged with Ar flows so that the radiation will only be absorbed in the active volume of the experiment. The effluent of the $FN_3$ source is connected to the reaction cell by a teflon coated tube and pumped off to vacuum by teflon lines. The reactant molecules are admitted through injectors in the tube. Pressure within the cell is regulated by a metering valve in the exhaust line and monitored by an inductance manometer.

Detection System: The radiation emitted from the reaction cell is monitored by either a gated optical multichannel analyzer (OMA) or a photomultiplier tube filtered by a grating monochromator and temporally analyzed by a digital signal averager. The primary signals of interest are the $NF(a \rightarrow X)$ and $NF(b \rightarrow X)$ emissions at 872 and 528 nm, respectively. The PMT/signal averager combination offers an efficient means of collecting the time profiles of these emissions. The OMA provides an efficient method to collect emission spectra at selected time intervals for diagnostic purposes.

II. DISSOCIATION OF $FN_3$ BY LASER PUMPING

In a second embodiment of the invention, NF* is generated by laser pumping of $FN_3$ at a frequency tuned to a vibrational transistion of $FN_3$. NF* is generated by dissociation of $FN_3$ in an apparatus such as shown in FIG. 4 using an appropriate laser without the addition of reactant molecules.

III. DISSOCIATION OF $FN_3$ BY DETONATION

A source of energy such as a spark or mechanical shock can be used to detonate $FN_3$ which is subject to spontaneous detonation in its liquid phase. A thin film of liquid $FN_3$ can be deposited by condensation and then detonated by a weak pulse from an $N_2$ laser, a spark, or mechanical shock. NF* is generated as a product of the resulting explosions.

The invention as described above is illustrative and is not intended to limit the scope of the invention. Numerous variations can be made without departing from the invention. For example, vibrationally excited molecules other than the exemplarly hydrogen fluoride and deuterium fluoride can be used. Based upon emperical tests, other halides of hydrogen and deuterium can be considered in addition to molecules such as carbon dioxide and nitrogen. Similarly, energy transfer lasing partner or emitting species other than BiF can be added to convert the stored energy of $NF(a^1\Delta)$ to photons.

What is claimed is:

1. A method for generating electronically excited nitrogen fluoride, comprising:
   providing $FN_3$; and
   dissociating the $FN_3$ to generate excited nitrogen fluoride according to the reaction:

$$FN_3 \rightarrow FN^* + N_2.$$

2. The method as claimed in claim 1, wherein dissociating the $FN_3$ comprises reacting the $FN_3$ with vibrationally excited molecules according to the reaction:

$$molecules(v) + FN_3 \rightarrow molecules + N_2 + NF(a).$$

3. The method as claimed in claim 2 wherein the vibrationally excited molecules are selected from the group consisting of hydrogen halide, deuterium halides, carbon dioxide, $SF_6$, and nitrogen.

4. The method as claimed in claim 3 wherein the vibrationally excited molecules comprise HF(v).

5. The method as claimed in claim 3 wherein the vibrationally excited molecules comprise DF(v).

6. The method as claimed in claim 1 wherein dissociating the $FN_3$ comprises laser pumping the $FN_3$.

7. The method as claimed in claim 1 wherein dissociating the $FN_3$ comprises detonating the $FN_3$.

8. A method for generating electronically excited nitrogen fluoride, comprising:
providing $FN_3$; and
reacting the $FN_3$ with vibrationally excited hydrogen fluoride according to the reaction:

$$HF(v) + FN_3 \rightarrow HF + N_2 + NF(a).$$

9. A method for generating electronically excited nitrogen fluoride, comprising:
providing $FN_3$; and
reacting the $FN_3$ with vibrationally excited deuterium fluoride according to the reaction:

$$DF(v) + FN_3 \rightarrow DF + N_2 + NF(a).$$

10. A method of lasing at short wavelengths comprising:
providing $FN_3$;
dissociating the $FN_3$ with $HF(v)$ to generate $NF(a^1\Delta)$; and
reacting the $NF(a^1\Delta)$ with the $HF(v)$ in an optically resonant chamber according to the reaction:

$$HF(v \geq 2) + NF(a^1\Delta) \rightarrow HF(v-2) + NF(b^1\Sigma)$$

to pump the NF(b-X) transition at 528 nm.

11. A method of lasing at short wavelengths comprising:
providing $FN_3$;
dissociating the $FN_3$ with $HF(v)$ to generate $NF(a^1\Delta)$;
adding an emitting species to the $NF(a^1\Delta)$;
reacting the $NF(a^1\Delta)$ with the emitting species in an optically resonant chamber according to the reaction:

$$NF(a^1\Delta) + \text{emitting species} \rightarrow \text{emitting species}^* + NF(a^1\Delta)$$

to convert the stored energy of $NF(a^1\Delta)$ to photons from the emitting species* whereby the pumping of the emitting species may occur by single or multiple sequential reactions with $NF(a^1\Delta)$.

12. A method of lasing at short wavelengths comprising:
providing $FN_3$;
dissociating the $FN_3$ with $DF(v)$ to generate $NF(a^1\Delta)$;
adding an emitting species to the $NF(a^1\Delta)$;
reacting the $NF(a^1\Delta)$ with the emitting species in an optically resonant chamber according to the reaction:

$$NF(a^1\Delta) + \text{emitting species}^* NF(b^1\Sigma)$$

to convert the stored energy of $NF(a^1\Delta)$ to photons from the emitting species*, whereby the pumping of the emitting species may occur by single or multiple reactions with $NF(a^1\Delta)$.

13. The method as claimed in claim 12 wherein the emitting species comprises BiF.

* * * * *